(12) United States Patent
Eisen

(10) Patent No.: US 7,275,583 B2
(45) Date of Patent: Oct. 2, 2007

(54) APPARATUS FOR PROCESSING MOLTEN MATERIAL

(75) Inventor: Peter Eisen, Winterthur (CH)

(73) Assignee: Fondarex SA, Sainte-Croix (CH)

( * ) Notice: Subject to any disclaimer, the term of this patent is extended or adjusted under 35 U.S.C. 154(b) by 464 days.

(21) Appl. No.: 10/931,860

(22) Filed: Sep. 1, 2004

(65) Prior Publication Data
US 2006/0042773 A1    Mar. 2, 2006

(30) Foreign Application Priority Data
Oct. 15, 2003    (EP) .................................. 03023320

(51) Int. Cl.
*B22D 17/08*    (2006.01)
(52) U.S. Cl. ................... 164/312; 164/305; 164/155.3; 164/155.4; 164/253; 164/254; 425/149
(58) Field of Classification Search ............... 164/312, 164/305, 155.3, 157, 457, 113, 61, 65, 253, 164/254, 155.4; 425/149; 264/40.1
See application file for complete search history.

(56) References Cited
U.S. PATENT DOCUMENTS
5,782,287 A * 7/1998 Iwamoto et al. ......... 164/155.3
6,202,733 B1 * 3/2001 Ratte ............................ 164/61

* cited by examiner

Primary Examiner—Jonathan Johnson
Assistant Examiner—Ing-Hour Lin
(74) Attorney, Agent, or Firm—Arnold B. Silverman; Eckert Seamans Cherin & Mellott, LLC

(57) ABSTRACT

An apparatus for processing molten material into a desired shape comprises a die or mold forming a cavity to receive molten material and to allow its solidification within the cavity. A source of vacuum is connectable to the cavity for sucking air out. A hollow after-pressure cylinder is in communication with the cavity so as to receive a portion of the material. The after-pressure cylinder has a first end for connection to the cavity, and a second, opposite end. In the region of the second end is a connection opening for connecting the vacuum source. An after-pressure piston is moveable in the after-pressure cylinder to press its portion of material into the cavity to compensate for any shrinkage of the material in the cavity. There is a drive for moving the after-pressure piston in its after-pressure cylinder into three different positions, i.e.:

(a) in a first position, the after-pressure piston is in the region of the cylinder's second end, leaving the connection opening in communication with the cavity,
(b) in the second position, the after-pressure piston has moved over the connection opening to interrupt the communication with the cavity, and
(c) in a third position, said after-pressure piston has moved from said second position towards said cavity to press said portion of material into it.

3 Claims, 4 Drawing Sheets

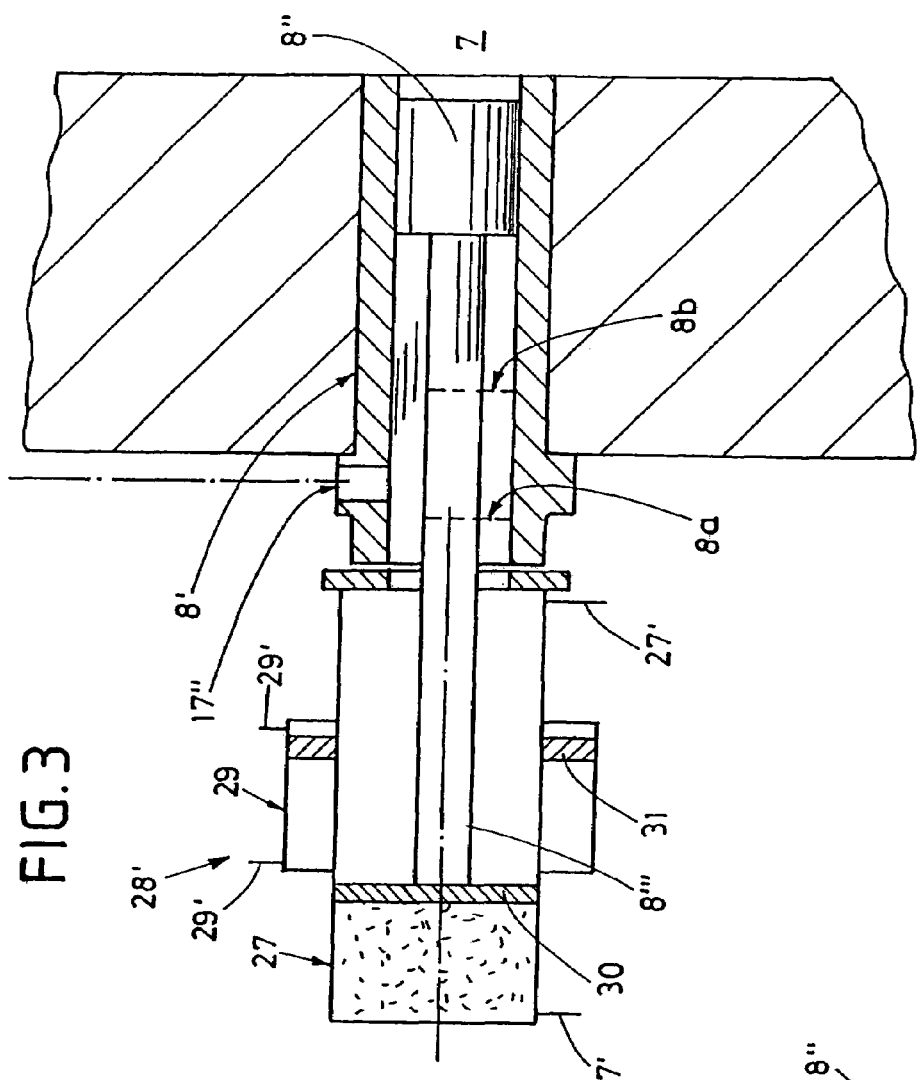
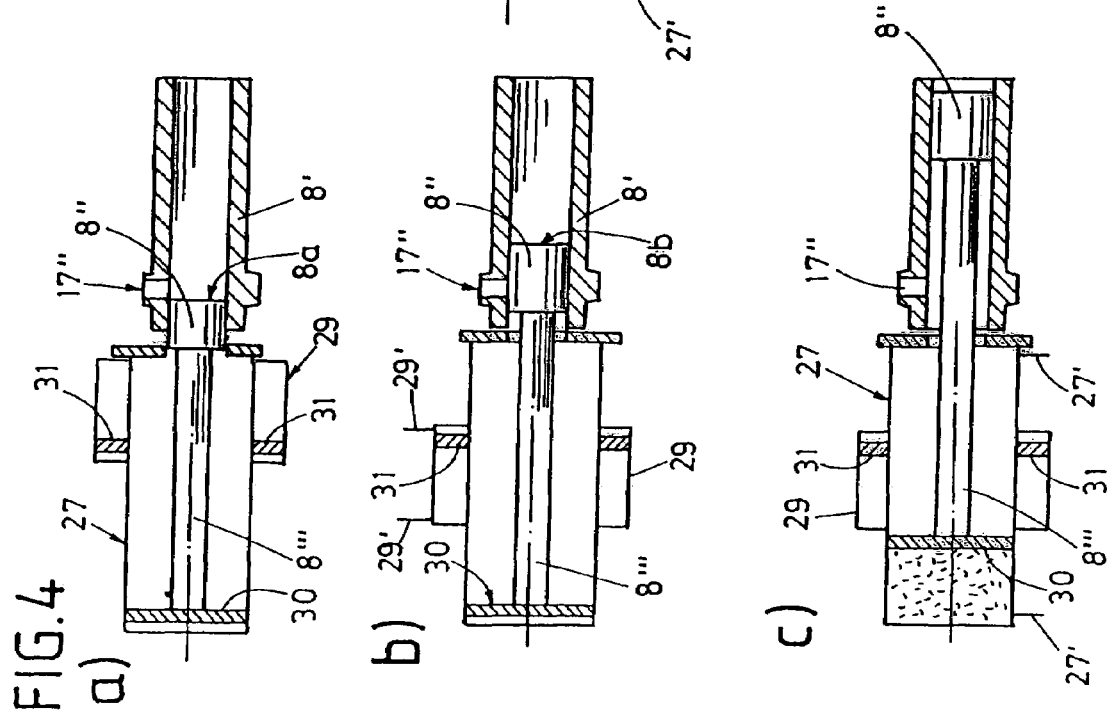

APPARATUS FOR PROCESSING MOLTEN MATERIAL

FIELD OF THE INVENTION

This invention relates generally to an apparatus for processing molten material, such as molten metal, particularly a light metal such as aluminum, or a molten plastic material. Depending on the material, such apparatuses are called "die-casting machine" in the case of a metal, or "injection molding machine" in the case of a plastic material. In both cases, there is a die or mold having a cavity with the negative shape of an article to be cast or molded, and a ram which is generally (but not exclusively) formed by a piston in a shot sleeve in the case of processing a metal, and is generally (but not exclusively) formed by an extruder screw in a barrel in the case of a plastic material.

Thus, the invention relates to a die-casting or injection molding machine for shaping a material, such as a metal, in a (die or mold) cavity. In this cavity, the material introduced shrinks during solidification and is re-densified by an after-pressure piston displaceable in an after-pressure cylinder by an appropriate after-pressure drive. The after-pressure cylinder has a first end for connection to the cavity (of the die or mold) and a second, opposite end remote from the cavity.

Furthermore, the invention relates to an after-pressure drive as well to the after-pressure unit (cylinder plus piston) itself. Finally the invention relates to an associated control unit.

BACKGROUND OF THE INVENTION

Machines of this kind have become known in a variety of constructions. An external after-pressure piston is particularly used, if the after-pressure (the pressure after shooting or injecting the material to be shaped into the cavity) of the ram is no longer sufficient to compensate for all shrinkage occurring in the cavity. This will generally be the case with all complicated dies or molds and with complicated shaped parts.

Just with such complicated dies or molds where some sections present a particularly high flow resistance, while other sections do not, there will be still another problem: Such cavities are difficult to evacuate efficiently. Certainly it has been suggested to provide one vacuum valve at the entrance of the cavity and another one at the end of the cavity, the valves serving to control sucking off the air contained in the cavity prior to inserting ("shooting" or injecting) the material to be shaped. This method, however, is not efficient with all types of cavities.

SUMMARY OF THE INVENTION

Therefore, it is an object to construct an apparatus defined in the outset in such a manner that air may be removed even from cavities of a very complicated shape.

This object is achieved according to the invention in that the region of the second, remote end of the after-pressure cylinder comprises at least one connection opening for connecting a vacuum source, and that the after-pressure piston may be advanced by means of its after-pressure drive from a first position, in which this connection opening is in free communication with the interior of the after-pressure cylinder, into a second position, in which the connection opening is covered and closed by the after-pressure piston, and from this second position in a further step towards the first end of the after-pressure cylinder and towards the cavity.

In this way, several advantages are achieved simultaneously:

on the one hand, air can be sucked off even from that region, where the after-pressure piston is active, and this will, generally be that region where the die or mold surrounds the largest volume of material and where a maximum of shrinkage will occur;

however, since the a maximum volume of material is present at this place, it is logical that less material is present in adjacent regions, which means narrower cross-sections of the cavity and, thus, a higher resistance against sucking air off;

i.e. in other words that according to the invention, sucking will occur just in that region which, up to now, due to the elevated flow resistance in the adjacent regions, could be evacuated with the lowest efficiency;

in addition, there is an advantageous double function of the known after-pressure unit which, according to the invention, is formed and used as a valve at the same time.

The invention relates also to a driving arrangement for an after-pressure piston, and a corresponding after-pressure unit.

BRIEF DESCRIPTION OF THE DRAWINGS

Further details of the invention will become apparent from the following description of embodiments schematically shown in the drawings, in which

FIG. 3 depicts an alternative to FIG. 2, using a double cylinder-piston arrangement, of which FIG. 4 in partial figures a), b), c) shows different piston positions achieved by this arrangement.

DETAILED DESCRIPTION OF THE DRAWINGS

Figure 1:
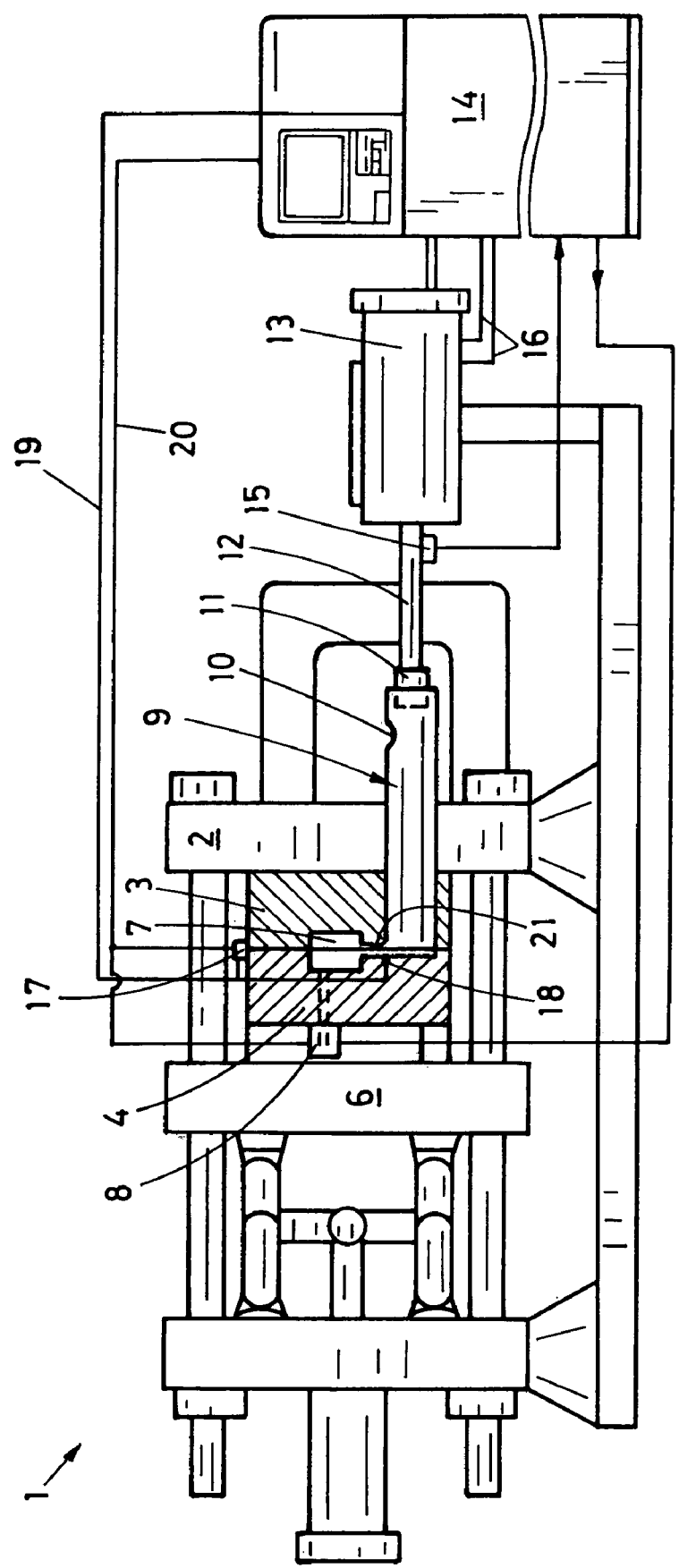
FIG. 1 is a lateral view of die-casting machine according to the present invention.

A die-casting machine 1, as usual, has a stationary die platen 2 to which a stationary die half or cover die 3 is mounted. This stationary die half or cover die 3, together with a moveable die half or ejector die 4 mounted on a moveable die platen 6 defines a cavity 7. To this cavity 7, an external after-pressure unit 8 is associated which in principle is known per se and is only schematically indicated in FIG. 1.

Figure 2:
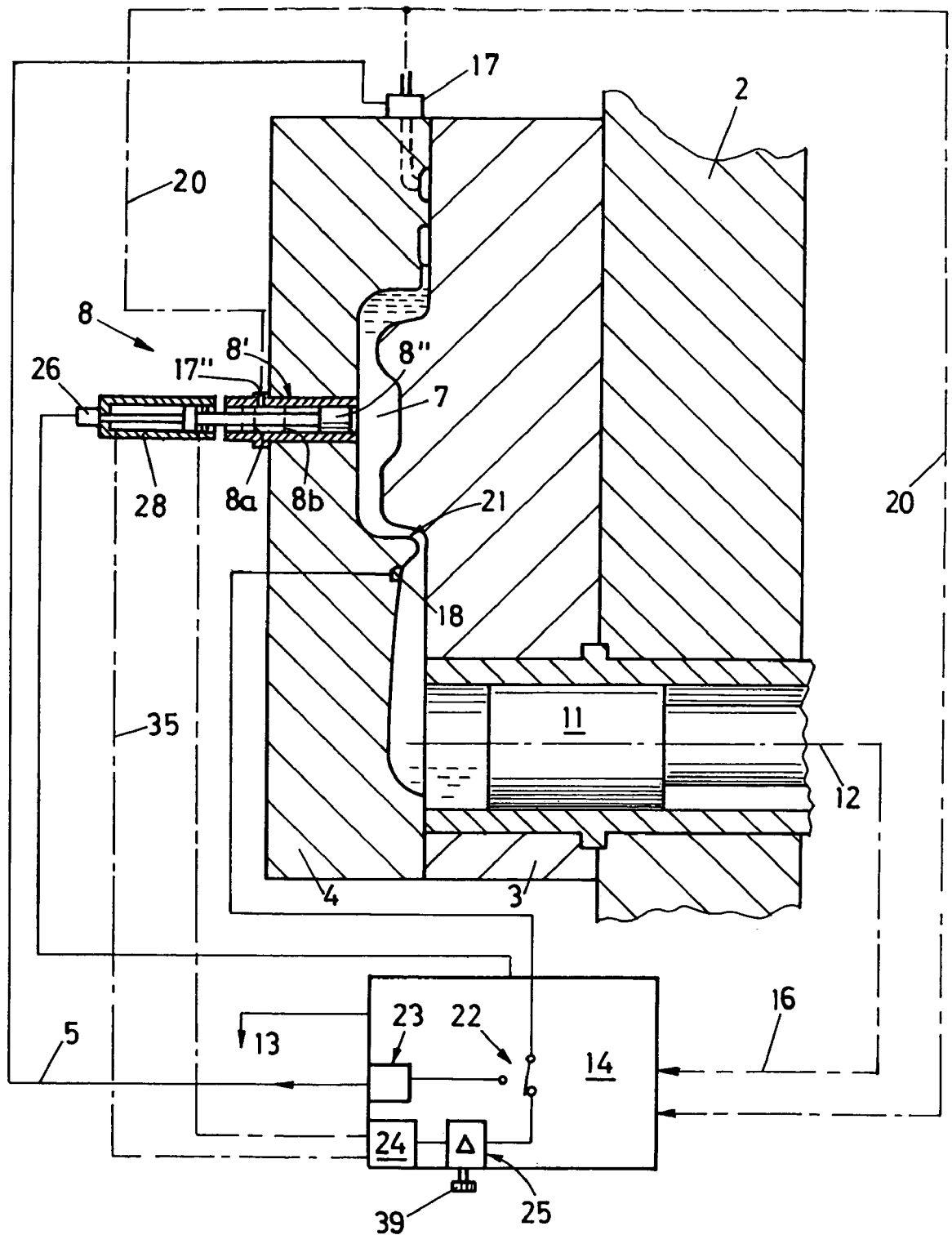
FIG. 2 is a detail of FIG. 1 illustrating the driving arrangement including a position sensor for sensing the positions of an after-pressure piston.

In the present embodiment, according to FIG. 2, the after-pressure unit 8 comprises an after-pressure piston 8". It should, however, be understood that the term "after-pressure piston", as used herein, should be understood in its broadest sense, i.e. encompassing not only a thickened piston member at the end of a piston rod, as is illustrated, but also an after-pressure rod of uniform diameter or any other ram member.

A shot sleeve 9 having a filling opening 10 is rigidly connected to the stationary die half 3. A casting piston 11 is displaceable within the sleeve 9 by means of a piston rod 12 which is driven by a hydraulic drive 13 (FIG. 1) in order to press metal filled into the sleeve through the opening 10 into a sprue or gating system ending at a gate 21, and then into the cavity 7. The hydraulic drive is controlled by a control unit 14 which may comprise not only electric/electronic components, but optionally also at least part of the hydraulic control components, such as valves and so on. To this end, the control unit 14 is coupled by lines 16, as is known per se, to a position and/or velocity and/or acceleration sensor 15 as well as to other sensors, such as at least one pressure sensor. It will be understood that in the case of an injection machine, the casting piston 11 will, in general, be replaced by an extruder screw (as a ram) rotating and displacing within an extruder barrel instead of a shot sleeve, although injection molding machines are also known which use a piston. Likewise, it is known to use an extruder as a ram in die-casting or so-called thixo-forming machines.

All these components and their arrangement is of known nature and may be modified at will within the scope of the present invention. It is also known to attach a vacuum valve 17 in the region of the parting plane of the two die-halves 3, 4. In the present embodiment, the vacuum valve 17, which opens or closes the communication between the cavity 7 and a vacuum conduit 20, is controlled by a metal front sensor 18 situated in the region of the gate 21, preferably in the sprue or gating system between the sleeve 9 and the cavity 7 immediately before the cavity 7 as shown. The sensor 18, upon arrival of the metal front, sends an appropriate output signal to the control unit 14. The response time of the metal front sensor 18 may, if necessary, be modified and adapted by appropriate electronic measures, such as delay circuitry in particular, but optionally (if the response of the sensor 18 is slow) by a differentiating circuit (for accelerating response), i.e. in each case by a circuit containing at least one capacitor. The response time of the sensor 18 is such that the valve 17 is enabled to close the vacuum line 20 and the access to a vacuum source (preferably contained in the control unit 14) within a period of time in which the metal, after having reached the sensor 18, reaches the valve 17. As will be explained later, the vacuum line may also be in communication with the after-pressure unit 8 which, according to the invention, is formed as a vacuum valve. This valve 8 is also controlled by the same sensor 18 and the control unit 14, optionally adapting the response time, as mentioned above.

The fact that a metal front sensor 18 in the region of the gate 21 is used to control the vacuum valves 8 and 17 has a special reason. According to the prior art, position signals derived from the position of the casting piston 11 have been used to control a respective vacuum valve so that it was closed in time in spite of a relative great inertia of the control circuitry. However, there was always one factor that affected the moment of closing the vacuum valve, and this was the degree of filling the shot sleeve 9 or, in other words, the amount of metal filled into the shot sleeve 9. For with a high filling degree, the cavity 7 is filled earlier than with a low filling degree. Therefore, it was attempted for a long time to keep the filling degree substantially constant which is not easy to attain. An alternative (although a quite expensive one) would be to located the metal front sensor in immediate vicinity of the respective vacuum valve 8 or 17. In this case, the sensor had to have a very quick response time which is only possible achieve with high expenses.

The present inventor started from the consideration that the volume of the cavity 7 of the same die 3, 4 is always constant. This means that the filling degree of the shot sleeve 9 has only an effect up to the moment when the metal reaches the gate 21. Therefore, the output signal of a metal front sensor (whatever its design might be) situated just in this region is independent from the filling degree of the shot sleeve 9. As a consequence, the output signal, instead of being forced to use an expensive quick reacting sensor for controlling the respective vacuum valve 8 and/or 20, may be provided by a traditional, slower sensor 18 without risking precision of the time of closing the valve. Therefore, it will be understood that the use of the output signal of a metal front sensor situated in the region of the gate 21, preferably immediately before the gate 21 (as shown), is an invention independent from the design of the valve or whether the vacuum valve is integrated into the after-pressure unit 8 or not. A further advantage is that in most cases the metal front sensor 18 has to be provided anyway to control the movement of the casting piston 11 and, therefore, is connected to the control unit 14 by a line 19 so that no additional part has to be provided and used.

It has been stated above that the cavity 7 has a constant volume; filling time could vary, however, nevertheless, if the velocity of the casting piston 11 were made dependent from the temperature of the die halves 3, 4 and/or of the metal itself (because with a cold die 3, 4, or with a low metal temperature, one could desire to fill the cavity 7 in a shorter time than with more elevated temperatures). In such a case, temperature signals supplied by appropriate temperature sensors could be used to correct the closing moment of the valves 8, 17 by corresponding stages 23, 25 which will be later discussed in detail.

As has already been mentioned, it is advantageous to connect the vacuum conduit 20 with the control unit 14 (which also controls the movement of the casting piston), instead of having a separate vacuum control unit comprising a source of vacuum, such as a pump, and an antifluctuator chamber which are then accommodated in the unit 14 so that no separate parts have to be provided. By the way, it is known to attach a control unit to the frame of a die casting or an injection molding machine 1, and this is, of course, possible with the unit 14.

FIG. 2 illustrates a first embodiment of the present invention where a so-called external after-pressure piston 8' (in contrast to an "internal" after pressure in the shot sleeve 9 exerted either by the casting piston 11 itself or by a so-called Acurad piston as disclosed in GB Patent No. 1,002,546) is displaceable in an after-pressure cylinder 8' by means of a drive 28, which is in general a hydraulic drive. According to the invention, the cylinder 8' together with its piston 8" serves also as a vacuum valve. To this end, the cylinder 8 presents a vacuum connection opening 17" which penetrates the cylinder's outer cylindrical surface and is connected to the vacuum conduit 20. If the piston 8" is in a first position 8a shown in dotted lines, the opening 17" communicates with the cavity 7 and sucks air from the cavity and through the vacuum conduit 20. If, however, the piston 8" is displaced over the opening 17" (particularly covering it, but optionally also after the opening 17"), the opening 17" is shut and out of communication with the cavity 7. Subsequently, the piston may act like an ordinary after-pressure piston by pressing metal, which has entered that end of the cylinder 8' that is in communication with the cavity 7 (this is the end opposite that end where the opening 17" is provided), back into the cavity 7 for compensating any shrinkage to which the metal in the cavity might be subjected during solidification.

In order to control the movement of the after-pressure piston 8" into its above-mentioned three positions, the drive unit 28 may be provided with a position sensor 26 which, in principle, may have any design, for example that as disclosed in U.S. Pat. No. 3,956,973 where a rod projecting from the drive cylinder has a thread which is magnetically sensed. Other designs of a combination of a position sensor and an after-pressure unit are known from a variety of documents, e.g. from U.S. Pat. No. 5,671,797, where this sensor has also an advantage in the control of the after-pressure.

Also in the case of such unit 8 serving a double purpose as an after-pressure unit and a vacuum valve, a separate metal front sensor may be associated. However, it is preferred if its function as a valve is controlled by the same sensor 18 which controls also the valve 17. The reason has already been mentioned, i.e. the fact that the filling time, in general, is independent from the filling degree of the shot sleeve 9. Since, however, the after-pressure piston 8" will mostly have a larger mass than a valve member, such as that of the valve 17, it will react slower. For this reason, a differentiating stage 25 may be connected in series before its drive 28 and a preponed hydraulic control stage 24, and receive the output signal of the metal front sensor 18 which is relative remote from the unit 8. Again, it should be noted that the use of a metal front sensor 18 in the region of the gate 21 for controlling at least one of the valves 8 and/or 17 constitutes an independent invention.

The drive 28 for the purpose discussed above is especially designed. For while it had to impart substantially a single movement to the piston 8" towards the connection opening of the cylinder 8' leading to the cavity 7 for exerting an after-pressure, as in the prior art, the combination according to the present invention comprising a valve opening or connection opening 17" requires a movement in two steps: for as soon as the output signal of the sensor 18 reaches the drive 28 (over the control unit 14), the drive 28 displaces the piston 8" in a first step of movement just by a stroke that it closes the connection opening 17" and/or interrupts the communication between the vacuum conduit 20 and the cavity 7. In this way, metal is prevent from entering the opening 17". Therefore, this opening 17" is arranged remote from the connection end of the cylinder 8', that leads into the cavity 7, and will generally be in the region of the opposite end as shown. This new or second position 8b after displacement from the first position 8a to the right (with reference to FIG. 2) may be determined by the position sensor 26 which informs the control unit 14 about the corresponding position of the drive 28. It will be understood, although a hydraulic drive 28 is described, any other type of linear drive desired may be used, such as a pinion-and-rack drive or a pneumatic drive. But in each case, the use of a position sensor 26 will be an advantage.

As soon as the after-pressure phase should begin, i.e. metal should be pressed from the connection end of the cylinder 8' into the cavity 7, the drive 28 displaces the piston 8" further from the second position 8b towards the cavity 7. As has been mentioned above, the output signal of the sensor 18 (which is sent to the control unit 14) may be used to initiate this movement, but optionally, if necessary, also an after-pressure movement of the casting piston 11 (or an Acurad piston as has been mentioned above) providing a delay if it is necessary or even accelerating it in relation to the moment when the valve 17 has to be closed.

For, it has also been mentioned above that it is advantageous to use a single sensor 18 in the region of the gate 21 for closing both valves 8 and 17. To this end, the output signal of the sensor 18, after the valve opening 17" has been closed suitably via the differentiating stage 25, is switched to a control line 5. This will normally be done by appropriately programming the control unit 14, but in the present case, a change-over switch 22 is represented to which conveniently a delay stage 23 for adapting the closing moment of the valve 17 (which may be an electro-valve controlled by an electromagnet), so that a single output signal can be used at least twice. However, this stage 23 may be omitted if the acceleration of the control due to the differentiating stage 25 corresponds just to that period necessary to move the valve 8 into its closed position, while the control without this acceleration is just right for closing the vacuum valve 17 in time. Of course, both valves 8 and 17 could be controlled each by a separate sensor, but it is understandable that the invention allows the use of a single sensor 18 for at least two valves 8 and 17. It would also be conceivable to have two vacuum valves in the place of the valve 17 or at different places in order to suck air from different locations of a complicated casting (e.g. by sucking from the left and from the right of the die halves 3 and 4). In the last named case, no adaptation of the closing time would be necessary, if both valves have to close at the same time.

In case at least one of the time adaptation stages 23 and/or 25 are provided, it may be advantageous to adjust this time when changing the die 3, 4 so as to have a different volume of the cavity of a new die (in the case of production of a different casting). In FIG. 2, the stage 25 is provided with an adjustment knob 39 by which, for example, a tolerance threshold for alterations detected by differentiation may be varied (or simply the delay or acceleration provided by the respective stage). An analogous adjustment device (not shown) may be provided to adjust the delay stage 23, in which the capacitance value of its capacitor circuit may be changed or (in the case of a digital design of the delay stage 23 comprising a counter that counts the clock pulses of a clock generator) the number of pulses to be counted by the counter up to the moment when it transmits the output signal to the drive. Adjustment could also be made automatically when changing the die by providing a code on the die (e.g. on the stationary die) which indicates its volume to be filled. This may be done in a similar way as is the case in cameras where the film cartridge is coded to introduce the film sensitivity. Likewise, changing the velocity of the piston 11 may easily be considered in the control unit 14, since it is preferred to have a united control both for the vacuum valves 8 and 17 and the casting piston 11. In this sense, having a control unit 14 in common is also a measure for adapting the response time of the valves 8, 17.

The invention is, however, not restricted to a particular drive in order to effect a two-step movement of the piston 8". In particular, a position sensor 26 is not necessary as will be described with reference to FIG. 3. In this embodiment, the drive 28' is formed as a two-step cylinder unit possessing two concentric cylinders 27, 29. An outer annular piston 31 is fixed to the inner cylinder 27 and moves in the outer, annular cylinder 29. With the after-pressure piston 8" and its piston rod 8''' connected is an inner drive piston 30 moving within the inner cylinder 27. To each cylinder 27 and 29, supply and discharge conduits 27' and 29' are associated for supplying and discharging a fluid, preferably a hydraulic fluid. These conduits 27' and 29' are in communication with the central control unit 14 in a manner not shown (cf. FIG. 1) so that supply and discharge are controlled by the unit 14, as will be explained later with reference to FIG. 5.

In this arrangement, each drive piston 30, 31 moves over an invariable stroke which is dimensioned in such a manner that the positions 8a and 8b as well as the third or end position represented in heavy lines in FIG. 3 can be reached using the entire possible stroke within the cylinders 27 and 29. Which one of the drive pistons 30 or 31 performs the first step of movement (so that the after-pressure piston 8" reaches position 8a) is not important. The embodiment illustrated, however, shows the preferred version in which the outer, annular drive piston 31 does the first step of movement by moving from the position shown in FIG. 4a) into the position shown in FIG. 4b).

Such an embodiment can do without any sensor, nevertheless enabling a very precise positioning. The principle of this embodiment is that two linear drives (whatever its design may be) are interconnected in such a manner that one drive (in FIG. 4, it is the annular unit 29, 31) moves the other by a predetermined stroke, after which the other drive becomes active and performs the second step of movement.

FIG. 4 illustrates the different positions of the double drive 28'. In FIG. 4a), the after-pressure piston 8" is in a starting position (8a in FIG. 3) in which the vacuum connection opening 17" communicates with the cavity through the free end of the after-pressure cylinder 8' fastened to the die 4 (cf. FIG. 2) to suck air out of the cavity 7. Both drive pistons 30 and 31 are in their left-hand end position in their respective cylinders 27 and 29.

As soon as the metal front sensor 18 (FIG. 2) associated to the unit 8 informs the control unit 14 about the arrival of metal (or plastic material in the case of an injection molding machine) due to the movement of the ram or casting piston 11, the control unit 14, through the connections 29' causes the annular drive piston 31 to move from the position according to FIG. 4a) to the right, i.e. into the position of FIG. 4b). The length of the cylinder 29 and/or the stroke of the annular piston 31 in it are dimensioned so that the after-pressure piston 8" moves from the position according to FIG. 4a), in which it leaves the vacuum opening 17" free, into a position where this opening 17" is out of communication with the cavity, preferably by shutting it by means of the after-pressure piston 8", as is depicted in FIG. 4b). In this way, it is ensured that metal flowing into the cavity (and partly into the free connection end of the after-pressure cylinder 8') cannot enter the opening 17". However, part of the metal will enter that end of the after-pressure cylinder 8' which is connected to the die half 4 and the cavity 7, thus forming a material reserve to be re-injected into the cavity by the after-pressure piston 8", when shrinkage has occurred in the cavity.

When the metal, being shot into the cavity 7 by the casting piston 11, has completely filled the cavity 7 and has almost reached the vacuum valve 17 (FIG. 1), this valve will close too (which is also controlled by the sensor 18, as has been discussed above), the material in the cavity 7 will solidify. In this moment, it is useful to compensate for shrinkage by means of the after-pressure piston 8" which conveys the material contained in the after-pressure cylinder 8' into the cavity 7. As has been mentioned above, the after-pressure unit 8 is usually placed where the cavity 7 forms a large space to receive much metal. This large amount of metal, however, will be subjected to significant shrinkage, whereas neighboring portions of the cavity may have a thinner cross-section so that any after-pressure exerted by the casting piston 11 (FIG. 2) will not have much effect. Therefore, the combination of a vacuum arrangement with an after-pressure unit 8 is just the right to do. For, whenever there are adjacent portions of the cavity which have a thinner cross-section, one can hardly suck the air out of the cavity 7, especially from places lying between the gate 21 and the unit 8, due to the high flow resistance.

In order to push the after-pressure piston 8" from the position according to FIG. 4b) towards the free connection end of the after-pressure cylinder 8' and towards the cavity 7, fluid is supplied to the left connection pipe 27' (with reference to FIG. 4b) and to the cylinder 27 so that the after-pressure piston 8" moves to the cavity into the position shown in FIG. 4c) or FIG. 3. It may be seen that the inner drive piston 30 is not displaced over the whole length of the cylinder 27 which means that this cylinder may be made shorter than represented in FIG. 4. As in the above mentioned U.S. Pat. No. 5,671,797, the cylinder 27 may be provided with a position sensor 26 and/or a pressure sensor (for limiting the after-pressure), the control being made in a manner known per se.

Figure 5:
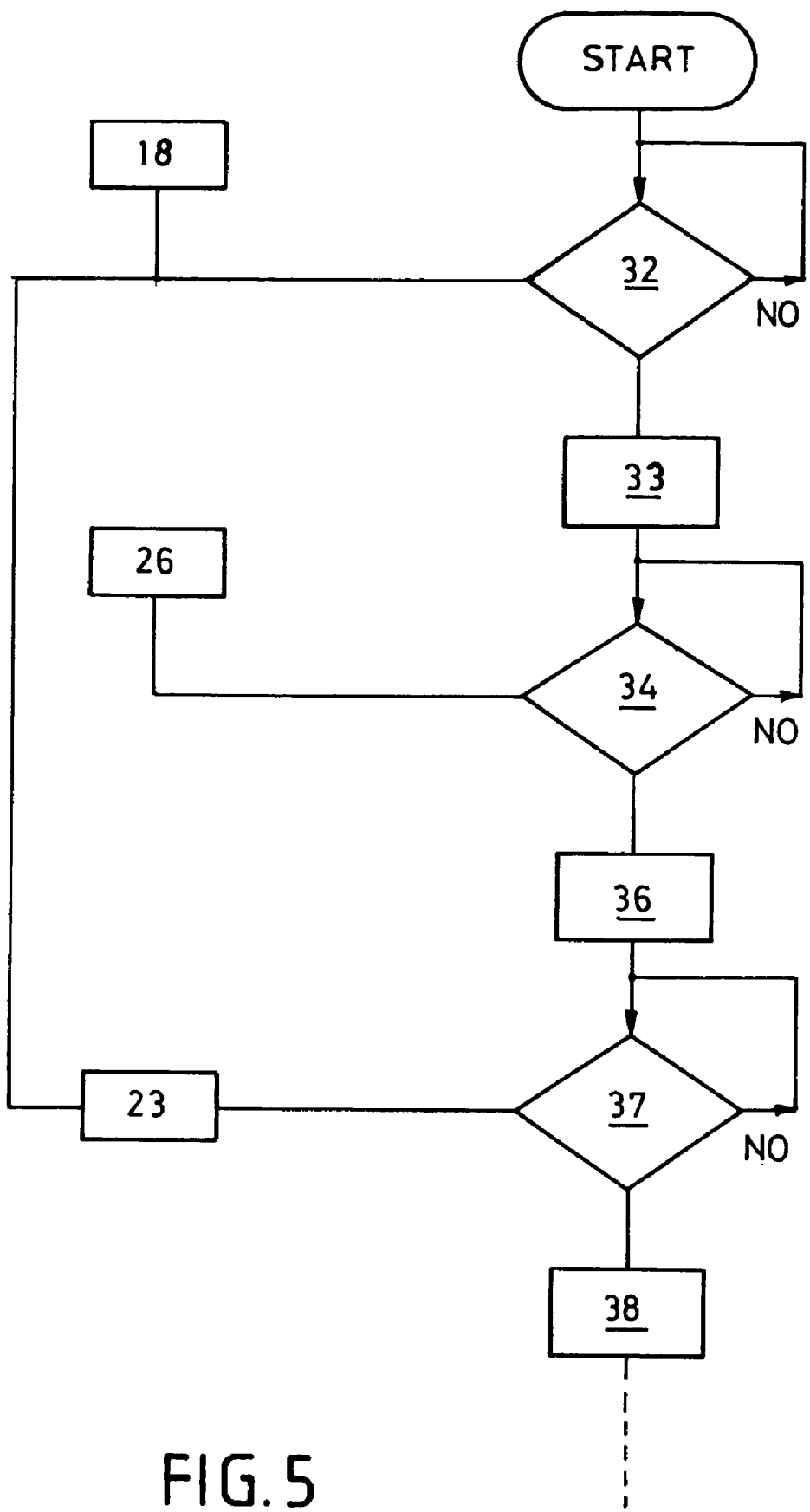
FIG. 5 a diagram for controlling the embodiment according to FIG. 2, but which is used also to explain the control of the embodiment according to FIGS. 3 and 4.

In the case of the driving arrangement 28 of FIG. 2, control is effected as will be described now with reference to FIG. 5. If a shot is released so as to move the casting piston 11 (or other ram) from a position behind the filling opening 10 (FIG. 1) towards the cavity 7 and the die halves 3, 4, the program is in the START condition. After that, the casting piston 11 moves up to the moment when it has covered the filling opening 10 and then continues to move (normally at a higher velocity) up to the moment when the metal has reached the region of the gate 21 (FIG. 2) and of the metal front sensor 18. Up to this moment, it is continuously checked over a question lozenge 32, whether the output signal of the metal front sensor 18 has already been sent out or not, the question being repeated when the answer is NO.

As soon as the output signal of the metal front sensor 18 has reached the control unit 14 (optionally over the time adaptation stage 25 of FIG. 2), a step 33 is initiated in which the driving arrangement 28 receives fluid through the conduit 35 (FIG. 2), thus advancing the after-pressure piston 8" from its initial position 8a towards position 8b. During this movement, the output signal of the position sensor 26 is checked (question lozenge 34), whether the position 8b has already been reached. If not, the question is repeated over the NO-exit of this lozenge 34. However, if the position 8b has been reached, a corresponding signal of the position sensor 26 is obtained, and the next step 36 can be initiated. In this step 36, supply of fluid through the conduit 35 is interrupted by the control unit 14 so that the after-pressure piston 8" is stopped in this position 8b in which, as has been mentioned before, the piston 8" closes the opening 17" and protects it against entering metal.

In the subsequent question lozenge 37, it is checked whether the output signal of the metal front sensor 18 has been arrived via the delay stage 23 which would mean closing the valve 17 (FIG. 2). Of course, the delay stage 23 can be omitted, if a separate sensor is associated to the valve 17, or if it is controlled in a customary way. As long as the output signal of the sensor 18 is not yet obtained through the delay stage 23, questioning is continued over the exit of the question lozenge 37. If, however, the output signal is received, step 38 is initiated in which the after-pressure piston 8" is advanced from position 8b towards the cavity 7 and the free connection end of the after-pressure cylinder 8' in order to effect redensification in the cavity 7. All other steps which, in cases, may be performed are of traditional nature and may correspond to the above-mentioned U.S. Pat. No. 5,671,797.

Controlling the embodiment according to FIGS. 3 and 4 is quite similar. After the START, the arrival of the material front (i.e. metal in case of a die-casting machine, or plastic material in case of an injection molding machine) at the sensor 18 is checked and awaited. Then, however, in the step 33, order is given to supply fluid to the driving cylinder 29 through the left-hand supply line 29' (with reference to FIG. 4) in order to move the annular piston 31 from the position according to FIG. 4a) into the position according to FIG. 4b), i.e. to move the after-pressure piston 8" from position 8a to position 8b in which it covers preferably the valve opening 17". Monitoring the arrival at position 8b by a position sensor 26 is not required, because the stroke of the piston is defined by the axial length of the annular cylinder 29 (or by an abutment surface situated therein which is optionally adjustable). This means that the next steps 34 and 36 will be omitted, if the driving arrangement is embodied as in FIGS. 3 and 4.

Subsequently, the moment of closing the valve 17 (FIGS. 1, 2) is awaited, as discussed above, wherein either a separate material front sensor or, as preferred, the sensor 18 via the delay stage 23 (whose time constant may optionally be adjustable) informs about the end of the filling phase in the cavity 7. Then, step 38 is effected such that fluid is supplied through the left-hand supply pipe 27') with reference to FIG. 4) to the inner drive cylinder 27, the after-pressure procedure being effected in a manner known per se.

After a complete shot or injection cycle, in which the piston assumes the position according to Fig. c), the initial position according to FIG. 4a) is assumed again. This reset movement may be effected either after a predetermined time of exerting after-pressure or in conjunction with an order of the control unit 14 to open the two die halves 3 and 4. In this case, the control stage 14 sends an order to supply fluid through the right-hand conduits 27' and 29' (according to FIG. 4) and to discharge fluid through the left-hand conduits 27', 29' until the initial position according to FIG. 4a) has been reached.

Numerous modifications are possible within the scope of the present invention. As has been mentioned above, the part of the drive cylinders 27 and 29 may be changed among each other, although this will, in general, not be desired. It is also clear that these driving arrangements or the after-pressure unit can be sold separately including the drive or not. The same applies to the control arrangement according to the present invention. It should be noted that in this description, the same reference numerals have been used for parts of the same function, while for parts of a similar function, the reference numerals obtained an additional sign.

It should be noted that the connection opening 17" will in general, be circular. However, in order to achieve a particular closing characteristic, the opening 17" may be given a special shape, if desired. For example, the opening 17" may be triangular, the triangle extending preferably in advancing direction of the after-pressure piston 8", either to achieve a "soft" closing characteristic (if the tip of the triangle points towards the cavity 7), or in the case of a reversed position of the triangle, to achieve a sudden shut of the valve after a period in which the highest possible suction pressure has been effective for a relative long time. Other shapes of the opening 17" would also be possible or even a plurality of them, although this will normally not be required.

What is claimed is:

1. An apparatus for processing molten material into a desired shape, comprising:

means for forming a cavity to receive said molten material and to allow solidification of said material within said cavity;

a source of vacuum to be connected to said cavity for sucking air out;

a hollow after-pressure cylinder in communication with said cavity so as to receive a portion of said material, said after-pressure cylinder having a first end for connection to said cavity, and a second, opposite end, the region of said second end including a connection opening for connecting said vacuum source;

after-pressure piston means moveable in said after-pressure cylinder to press said portion of material into said cavity to compensate for any shrinkage of said material;

drive means for moving said after-pressure piston in said after-pressure cylinder into three different positions, wherein (a) in a first position, said after-pressure piston is in the region of said second end, leaving said connection opening in communication with said cavity, (b) in the second position, said after-pressure piston has moved over said connection opening to interrupt said communication with said cavity, and (c) in a third position, said after-pressure piston has moved from said second position towards said cavity to press said portion of material into said cavity.

2. Apparatus as claimed in claim 1, wherein said apparatus is a die-casting machine and said material is a metal.

3. Apparatus as claimed in claim 1, wherein said apparatus is an injection molding machine and said material is a plastic material.

* * * * *